United States Patent
Alodeh et al.

(10) Patent No.: US 11,108,447 B2
(45) Date of Patent: Aug. 31, 2021

(54) SPATIO-TEMPORAL PRECODING FOR FASTER-THAN-NYQUIST SIGNAL TRANSMISSIONS

(71) Applicant: UNIVERSITÉ DU LUXEMBOURG, Esch-sur-Alzette (LU)

(72) Inventors: Maha Alodeh, Luxembourg (LU); Danilo Spano, Luxembourg (LU); Symeon Chatzinotas, Luxembourg (LU)

(73) Assignee: UNIVERSITÉ DU LUXEMBOURG, Esch-sur-Alzette (LU)

( * ) Notice: Subject to any disclaimer, the term of this patent is extended or adjusted under 35 U.S.C. 154(b) by 0 days.

(21) Appl. No.: 16/489,572

(22) PCT Filed: Feb. 28, 2018

(86) PCT No.: PCT/EP2018/054982
§ 371 (c)(1),
(2) Date: Aug. 28, 2019

(87) PCT Pub. No.: WO2018/158346
PCT Pub. Date: Sep. 7, 2018

(65) Prior Publication Data
US 2020/0014438 A1    Jan. 9, 2020

(30) Foreign Application Priority Data
Mar. 1, 2017    (LU) .................................... 100110

(51) Int. Cl.
*H04W 28/06*    (2009.01)
*H04B 7/06*     (2006.01)
*H04L 25/03*    (2006.01)

(52) U.S. Cl.
CPC ......... *H04B 7/06* (2013.01); *H04L 25/03343* (2013.01); *H04L 25/03834* (2013.01); *H04W 28/06* (2013.01)

(58) Field of Classification Search
USPC ............................................... 375/214
See application file for complete search history.

(56) References Cited

U.S. PATENT DOCUMENTS

| | | | |
|---|---|---|---|
| 2011/0188550 A1* | 8/2011 | Wajcer | H04L 25/03343 375/214 |
| 2019/0109743 A1* | 4/2019 | Gattami | H04L 27/264 |
| 2019/0254718 A1* | 8/2019 | Jackson | A61B 17/7032 |

FOREIGN PATENT DOCUMENTS

WO    2016165761 A1    10/2016

OTHER PUBLICATIONS

Alodeh Maha et al. "Energy-Efficient Symbol-Level Precoding in Multiuser MISO Based on Relaxed Detection Region", IEEE Transactions on Wireless Communications (2016), vol. 15, No. 5, pp. 3755-3767.

(Continued)

*Primary Examiner* — Eva Y Puente
(74) *Attorney, Agent, or Firm* — Lando & Anastasi, LLP

(57) ABSTRACT

The invention provides a method and device for sending K data messages simultaneously from a data transmission device to K receivers, over a Multiple Input Single Output, MISO, channel. The transmitter uses a Faster-than-Nyquist signaling rate. By making use of spatio-temporal channel interference model at the transmitter, the benefits of FTN in terms of effective rate and energy efficiency do not come at the expense of increased receiver complexity.

13 Claims, 2 Drawing Sheets

(56) References Cited

OTHER PUBLICATIONS

Zhang, G et al. "Simulation of precoding algorithms based on matrix decomposition for faster-than-Nyquist signaling," 25th Wireless and Optical Communication Conference (WOCC), IEEE, (2016), pp. 1-5.
Office Action in corresponding European Patent Application No. 18710798.2 dated Aug. 27, 2020.

* cited by examiner

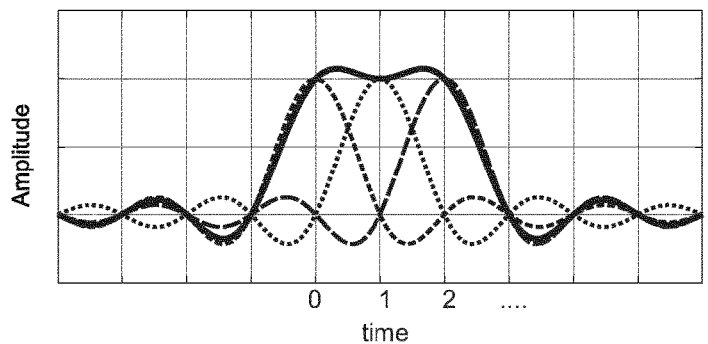
Fig. 1 [prior art]
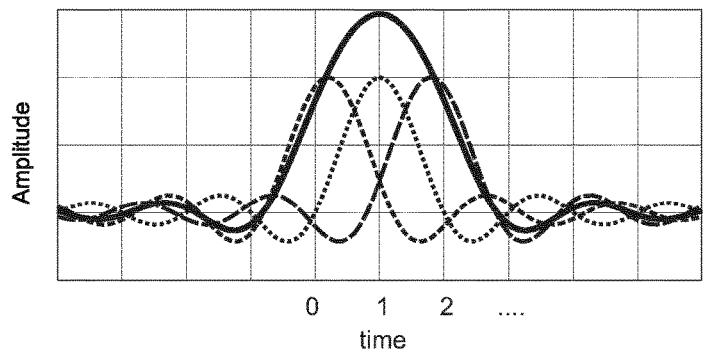
Fig. 2 [prior art]
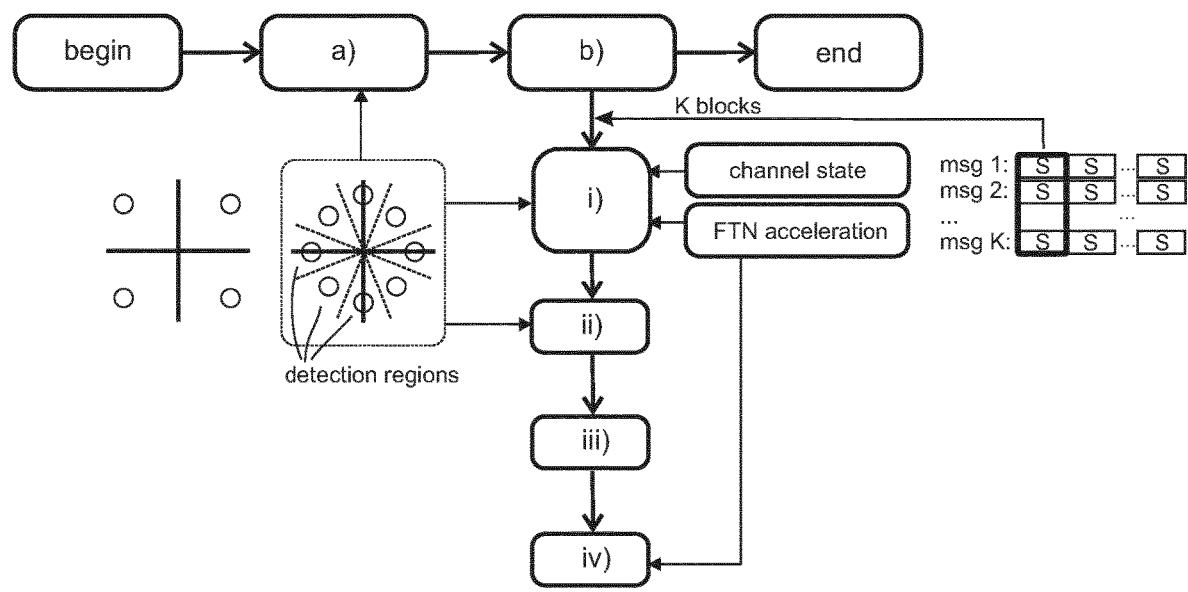
Fig. 3

SPATIO-TEMPORAL PRECODING FOR FASTER-THAN-NYQUIST SIGNAL TRANSMISSIONS

CROSS-REFERENCE TO RELATED APPLICATIONS

This application is a U.S. National Stage Application under 35 U.S.C. § 371 of International PCT Application No. PCT/EP2018/054982 entitled "SPATIO-TEMPORAL PRECODING FOR FASTER-THAN-NYQUIST SIGNAL TRANSMISSIONS," filed Feb. 28, 2018, which claims priority to Luxembourg Application No. 100110, filed Mar. 1, 2017, each of which is incorporated by reference herein in its entirety.

TECHNICAL FIELD

The present invention lies in the field of digital communications

BACKGROUND OF THE INVENTION

A multiple input data communication channel allows concurrently sending different data symbols to different receivers. The data symbols that are transmitted at the same time interfere with each other, so that each receiver receives a combination of all data symbols transmitted to all receivers at a given time. In traditional systems, the goal is therefore to design transmission methods which mitigate such multiuser interference. In digital communication systems, data is encoded into signals using a digital modulation technique before being transmitted using a digital communication channel. A digital modulation scheme is typically defined by a signal constellation in a complex plane, each signal point of the constellation corresponding to a data symbol. Once a receiver demodulates the received signal, it maps the received signal point to the signal constellation, and detects the signal as the symbol associated with the closest available constellation point.

If the level or kind of interference induced by the channel on the transmitted signals is known at the transmitter, it has been suggested to exploit the spatial interference induced by the data communication channel by applying precoding to data symbols. Precoding pre-emptively addresses known or estimated channel behaviour, which would adversely affect the reception of the transmitted data symbols otherwise. While multiuser interference induced by the specificities of the data transmission channel may be defined as spatial interference, other forms of interference may have an influence on the correct detection of the received symbols at their respective receivers.

Faster-than-Nyquist, FTN, signaling is a method of improving bandwidth efficiency of conventional orthogonal modulation schemes. A signaling system is said to be faster-than-Nyquist if the pulses that are transmitted on the data communication channel appear at a rate higher than the allowed Nyquist condition for intersymbol-interference free transmission, see e.g. J. E. Mazo, "Faster-than-Nyquist signaling," *Bell Syst. Tech. J.*, October 1975. As a result, interference in both time and frequency, generally referred to as intersymbol interference, ISI, is induced. ISI may thus be considered to as temporal interference among subsequently transmitted signals.

In known systems using FTN signaling, the complexity introduced by ISI is shifted to the receiver, which must accommodate for the correct detection of the received signals. While improving bandwidth efficiency using FTN is an interesting goal, the need of specific and complex receivers hinders its adoption in most practical communication systems. For example, patent document WO 2016/165761 A1 discloses FTN transmission of data in a Multiple Input Multiple Output environment. This environment is not suitable for transmitting data from a single transmitter to multiple users at the same time. While in the disclosed system, precoded symbols are transmitted at an FTN signaling rate, the precoding step in itself only takes into account interference that is due the state of the transmission channel.

Technical Problem to be Solved

It is an objective to present a method and device, which overcome at least some of the disadvantages of the prior art. In particular, it is an objective of the present invention to provide a method for implementing FTN signaling on a multiple-input single output, MISO, data communication channel, without requiring specific and complex receivers.

SUMMARY OF THE INVENTION

According to a first aspect of the invention, a method for sending K data messages, each data message comprising blocks of S data symbols, simultaneously from a data transmission device to K receivers, over a Multiple Input Single Output, MISO, channel, is provided. The channel introduces inter-user interference on transmitted signals. The method comprises the following steps:
a) selecting, using selection means, a signal constellation associated with a digital modulation scheme, the signal constellation comprising a plurality of constellation points, wherein each constellation point is associated with a data symbol and with a corresponding detection region;
b) for the data symbols of each set of K blocks, wherein each block stems from one of the K data messages,
  i) computing, using precoding means, S·K corresponding precoded symbols;
  ii) using digital modulation means, modulating a carrier signal in accordance with said digital modulation scheme, to represent a modulated signal for each of said precoded symbols;
  iii) using pulse shaping means, generating signal pulses corresponding to each of said modulated signals;
  iv) transmitting said signal pulses on said MISO channel.

The method is remarkable in that the signal pulses corresponding to consecutive sets of K blocks are transmitted at a signaling rate that is higher than the Nyquist rate associated with said signal pulses, thereby introducing inter-symbol interference. Further, said precoded symbols are computed so that, after suffering said inter-user interference and said inter-symbol interference during transmission, the data symbols of the K transmitted blocks received at the K respective receivers lie in their corresponding detection regions. The computation of the precoded symbols depends on said signaling rate, which is higher than the Nyquist rate associated with said signal pulses.

Preferably, the computation of the precoded symbols further depends on the shape of said signal pulses.

The signal constellation chosen for each receiver may preferably be different from one another. It may preferably depend on each receiver's transmission rate requirements.

Preferably, channel state information describing the inter-user interference may be received at the transmitter, through feedback received from said receivers. Alternatively, the transmitter may compute, using computing means, estimated inter-user interference based on a computational channel model describing the expected behaviour of said MISO channel. The computing means may preferably comprise a processor or a central processing unit of a computing device.

Each block may preferably comprise one data symbol, S=1.

Further preferably, the data transmission device may comprise N transmit antennas configured for transmitting said signal pulses, wherein N is larger than K.

Said digital modulation scheme may preferably be selected so that a predetermined data transmission rate is achieved during said transmission to the K receivers.

Predetermined data transmission rates may preferably be communicated to the transmitter prior to the data transmission by the receivers. The data transmission rates may preferably indicate a preferred or required Quality of Service, QoS.

Said MISO channel may preferably be a wireless channel. Alternatively, it may be a wired channel.

Preferably, precoded symbols may be transmitted to their respective receivers in a data frame comprising a preamble identifying the selected digital modulation scheme and the associated signal constellation.

The symbol transmission period, during which said signal pulses corresponding to consecutive sets of K blocks are transmitted, may preferably have a duration that is substantially equal to 0.5 to 0.95 times the transmission period corresponding to the Nyquist signaling rate.

It is a further object of the invention to provide a data transmission device for transmitting precoded data symbols using digitally modulated pulse shaped signals to K receivers over a common Multiple Input Single Output, MISO, data communication channel. The device comprises a memory element for storing K data messages, data transmission means adapted to transmit data to each of said receivers using at least one of said data communication channel's multiple inputs at a signaling rate that is higher than the Nyquist rate associated with the used signal pulses, and processing means operationally coupled to said memory element and data transmission means, configured to perform the method steps in accordance with the present invention. Preferably the data transmission means comprise a networking interface of a computing device and the processing means comprise a data processing unit, or data processor, of a computing device.

The device may preferably comprise N transmit antennas configured for transmitting signal pulses, wherein N is larger than K.

Further, the device may preferably comprise data reception means configured for receiving channel state information feedback from said receivers. The data reception means may preferably comprise a networking interface of a computing device.

It is another object of the present invention to provide a computer configured for carrying out the method in accordance with the present invention.

It is yet another object of the present invention to provide a computer program comprising computer readable code means, which when run on a computer, causes the computer to carry out the method in accordance with the present invention.

Finally, it is an object of the present invention to provide a computer program product comprising a computer-readable medium on which the computer program in accordance with the present invention is stored.

The present invention suggests to use a faster than Nyquist signaling rate when transmitting multiple data symbols to multiple users concurrently over a Multiple Input Single Output, MISO, data communication channel. Besides the spatial interference induced on the transmitted signal pulses by the channel itself, the invention therefore deliberately introduces intersymbol interference in the time domain between consecutively transmitted signal pulses. By using FTN signaling, the inventors have observed significant gains in terms of effective rate and energy efficiency, compared to known transmission schemes. The transmitter uses a symbol precoding step, during which a precoded symbol is computed for each one of K data symbols that are to be transmitted concurrently to K receivers. The computation of the precoded symbols not only takes into account the spatial interference that is expected to be induced by the channel during transmission, but importantly it also takes into account the intersymbol interference introduced by the transmitter itself through the use of FTN signaling. By doing so, the invention allows to reap the benefits of FTN signaling while using known receivers, which do not have to cope with the complexity introduced by FTN signaling. Indeed, the proposed spatio-temporal precoding step renders the FTN signaling transparent to the receiver, and the added complexity solely resides at the transmitter and its precoding module. This is particularly useful for the deployment of FTN signaling in applications for which multiple receivers are already in use. The same receivers remain useful but experience a performance upgrade when the transmitter performing the precoding step in accordance with the invention is used, compared to the use known transmitters.

BRIEF DESCRIPTION OF THE DRAWINGS

Several embodiments of the present invention are illustrated by way of figures, which do not limit the scope of the invention, wherein:

FIG. 1 is an illustration of three subsequent signal pulses in the time domain, when signaling in accordance with Nyquist's signaling condition is used;

FIG. 2 is an illustration of three subsequent signal pulses in the time domain, when FTN signaling is used;

FIG. 3 shows a flowchart indicating the main steps of a preferred embodiment of the method according to the invention;

DETAILED DESCRIPTION OF THE INVENTION

Figure 4:
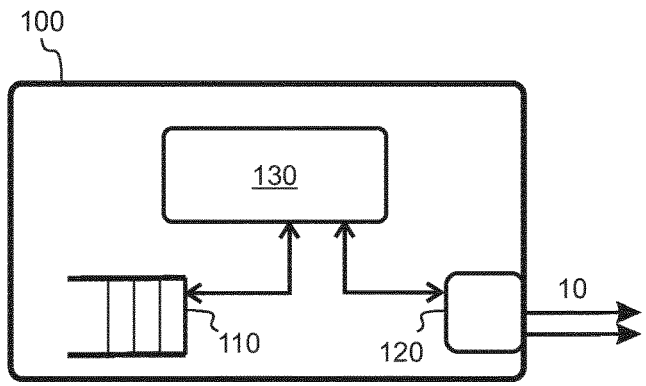
FIG. 4 shows a schematic illustration of a preferred embodiment of the device according to the invention.

This section describes the invention in further detail based on preferred embodiments and on the figures. It should be noted that features described for a specific embodiment described herein may be combined with the features of other embodiments unless the contrary is explicitly mentioned.

FIGS. 1 and 2 recall the effect of Nyquist's condition or upper limit on the signaling rate on intersymbol interference. In the example of FIG. 1, sin c-shaped signal pulses are consecutively transmitted on a data communication channel at a rate which is equal to Nyquist's signaling condition. It is considered that during each integer transmission slot (0, 1, 2, . . . ), one signal pulse is transmitted. Each of the depicted three dashed pulses has a non-zero amplitude at only one integer slot along the time axis, while at all other integer times, the pulses have zero amplitude. The depicted pulses have non-zero amplitude at times 0, 1 and 2 respectively. Specifically, the first pulse has zero amplitude at those time slots (1 and 2) at which the following pulses have non-zero amplitude. The mathematical meaning of this is that the product of two pulses offset by an integer number of symbol times has integral zero; the practical meaning is that pulses are invisible to each other. This makes optimal detection possible in a symbol-by-symbol way, with a matched filter and a sampler at the receiver's end of the data communication channel.

In FIG. 2, the three sin c-shaped pulses are transmitted a rate that is faster than the Nyquist signaling limit. This corresponds to FTN signaling. It becomes obvious that, as a consequence of these faster consecutive transmissions, at each integer time slot, the three pulses have non-zero amplitude and they interfere as their respective amplitudes add up. Of course, if all the information encoded into the three sin c pulses may be recovered by the receiver, FTN signaling allows to increase the effective rate of the channel. In accordance with the present invention, the inter-symbol interference introduced by FTN signaling is used, in combination with the spatial interference introduced by a MISO data communication channel, during a combined symbol-level precoding step. The precoded symbols are then digitally modulated and the corresponding modulated signals are pulse shaped and transmitted at the specified FTN signaling rate over the MISO channel. The precoding allows to take into account the intersymbol- and inter-user-interference, so that that each receiver is able to detect their respective data symbols correctly with high probability.

FIG. 3 illustrates the main steps of a preferred embodiment of the method in accordance with the invention. The method aims at sending K data messages simultaneously from a data transmission device, the transmitter, to K respective receivers. Each one of the K data message comprises block having each S data symbols, S being equal to 1 or larger. The data transmission medium is a Multiple Input Single Output, MISO, channel, which introduces spatial inter-user interference on signals transmitted thereon. The channel may for example by a wireless broadcast channel, and the multiple inputs of the channel may or example be multiple (N>>K) antennas of an antenna array.

At step a), a signal constellation associated with a digital modulation scheme is selected by selection means. The selection means are for example implemented by a data processor programmed to that effect through appropriate program code means. Each signal constellation comprises a plurality of constellation points, and each constellation point is associated with a data symbol and with a corresponding detection region. The transmission device has access to a plurality of signal constellations, such as m-PSK, m-QAM, etc. . . . . Any signal constellation may be used by the transmission device, which stored the corresponding information in a memory element foreseen for this purpose. The selection is preferably based on predetermined data transmission rates, which may for example be dictated by the K receivers. The signal constellation is chosen so that the desired data transmission rates are achievable. It is well known that higher order constellations are capable of achieving higher rates.

During step b), for the data symbols of each set of K blocks, wherein each block stems from one of the K data messages, each data message being addressed to one of the K receivers, the following steps are then performed.
i) using precoding means, S·K corresponding precoded symbols are computed;
ii) using digital modulation means, a carrier signal is modulated in accordance with the selected digital modulation scheme, to represent a modulated signal for each of said precoded symbols;
iii) using pulse shaping means, signal pulses corresponding to each of said modulated signals are generated;
iv) said signal pulses are then transmitted on the MISO channel at a rate that is higher than the Nyquist rate associated with said signal pulses.

Crucially, during the precoding step, not only the inter-user interference, but also the inter-symbol interference, the latter being specifically introduced through FTN signaling, are taken into account, so that the data symbols of the K transmitted blocks, once received at the K respective receivers, lie in their corresponding detection regions of the selected signal constellation. In known symbol-level precoding approaches, a channel model describing only the effects of spatial interference on the transmitted data is used, wherein the choice of signal constellation defines set of constraints that need to be fulfilled by the data symbols after reception in order to be correctly detected. Such channel models may be purely mathematical models allowing the computation of the expected behaviour of the channel, or they may be based on previously observed behaviour of the channel, which may be obtained through channel state information feedback that is generated at the receivers and fed back to the transmitter. Combinations of both approaches, wherein a mathematical model is refined through observed feedback are also known. The precoding step in accordance with the invention further uses a spatio-temporal channel interference model, which in addition also describes the effects of ISI, which are due to the FTN signaling rate at which the shaped signal pulses are put onto the MISO channel. Further formal details about the computation of the precoded symbols will be given by way of a further preferred embodiment of the invention here below.

As the actual FTN signaling rate is chosen at the transmission device, it's impact on the ISI is readily available at the transmission device for using it during the precoding step. The inter-user interference induced by the channel may either be estimated using known channel behaviour models, or it is preferably estimated from channel state information feedback, which may be periodically received from the K receivers. It is assumed that the channel state remains constant over the transmission time corresponding to at least one symbol transmission.

The precoding means, digital modulation means and pulse shaping means may preferably implemented by a data processor programmed to implement the described actions by appropriate program code means. It is noted that a person with ordinary skills in the art will be able to program a software program for implementing the described functionalities using their common skills in the art. Alternatively, the corresponding functionalities may be implemented by electronic circuitry, or by combinations of both approaches.

FIG. 4 provides a schematic illustration of a preferred embodiment of a data transmission device 100 in accordance with the invention. The device is configured for the transmission of precoded data symbols using digitally modulated pulse shaped signals to K receivers over a common Multiple Input Single Output, MISO, data communication channel. The channel may for example by a wireless broadcast channel, and the multiple inputs of the channel may or example be multiple (N>>K) antennas of an antenna array. Further, the device comprises a memory element 110 for storing K data messages. The memory element may for example be a random-access memory or a non-volatile memory, such as a Hard Disk Drive or a Solid-State Drive. The device 100 further comprises data transmission means 120 adapted to transmit data to each of said K receivers using at least one of said data communication channel's multiple inputs at a signaling rate that is higher than the Nyquist rate associated with the used signal pulses. The data transmission means 120 may for example comprise a networking interface. The device's processing means 130 are operationally coupled to said memory element and data transmission means, and configured, preferably through appropriate program code means, to perform the method steps a) and b)-i) to b)-iv) in accordance with the invention.

Further details of the invention and possible implementations thereof are outlined by way of further preferred embodiments.

1. Introduction to Further Preferred Embodiments

The remainder of this description is organized as follows: the system model is described in section 2. FTN symbol level precoding is formally described in section 3. In section 4, numerical results are presented.

Boldface upper and lower case letters are used for matrices and column vectors, respectively. $(\bullet)^H$, $(\bullet)^*$ stand for Hermitian transpose and conjugate of $(\bullet)$. $E(\bullet)$ and $\|\bullet\|$ denote the statistical expectation and the Euclidean norm. $\angle(\bullet)$, $|\bullet|$ are the angle and magnitude of $(\bullet)$ respectively. $R(\bullet)$, $I(\bullet)$ are the real and the imaginary part of $(\bullet)$, i indicates the complex part of the number. $\odot$, $\otimes$ denotes the Hadamard and Kronecker products respectively. Finally, $1_{a \times b}$ and $I_a$ denote the matrix of all ones of size a×b and identity matrix of size a×a.

2. System Model

It is assumed that the system communicates K independent messages to K single-antenna users through N transmit antennas. Each data stream is divided in blocks of S symbols. The channel is assumed to be quasi-static block fading, namely it remains constant for each block. In this context, $S=[s_1 \ldots s_K]^T$ is a K×S matrix aggregating the K×1 input symbol vectors for each symbol slot. Similarly, D is a N×S matrix representing the input signal vectors to the N transmit antennas for each symbol slot. Each input signal has to undergo pulse shaping before transmission. The analog waveform $\alpha(t)$ is formally defined through its discrete samples $\alpha[iT]$, where T is the symbol period. Assuming a unit-power symmetric pulse centered at zero with duration $2\eta T$, it can be stated that $\alpha[iT]=\alpha[-iT]$ and $\alpha[iT]\approx 0$ for $i<-\eta$ or $i>\eta$. For infinite pulses, $\eta$ is defined by the time required so that the pulse decays below a sufficiently low level so that the ISI can be considered negligible.

Due to the pulse memory, the sth transmitted signal by the mth antenna can be written as:

$$[X]_{ms} = \sum_{i=-\eta}^{\eta} \alpha[iT][D]_{mi} \quad (1)$$

where X is a N×S matrix representing the output signal vectors to the N transmit antennas for each symbol slot. Let A be defined as symmetric S×S Toeplitz matrix, whose first row is defined as $a=[\alpha[0]\ \alpha[T] \ldots \alpha[\eta T]\ 0 \ldots 0]$. As a result, the pulse shaping process can be expressed as a linear multiplication X=DA.

According to the well-known multiuser MISO channel model, the received symbols at the users can be written in matrix form as:

$$Y=HX+Z=HDA+Z \quad (2)$$

where Y is a K×S matrix representing the received signals at the K users for each symbol slot, $H=[h_1 \ldots h_K]^T$ is a K×N matrix representing the spatial channels among M antennas and K users and Z is a matrix representing the Additive White Gaussian Noise, AWGN. In this work, we focus on real channels, although it can be straightforwardly applied to complex channels. By vectorizing over the time dimension (rows first) for a single block, the above model can further be expanded into a simpler form, the vector representing the transmitted signals from all M antennas for all S symbols can be formulated as:

$$x=\text{vec}(X^T)=(I_K \otimes A^T)d \quad (3)$$

and the received signal can be expressed in a vector form as:

$$y = \underbrace{(H \otimes A^T)}_{G} d + z \quad (4)$$

where $y=\text{vec}(Y^T)$ is a KS×1 vector representing the received signals at all K users for all S symbols, d is a NS×1 vector representing the input signals before pulse shaping at all N antennas for all S symbols and z is a KS×1 vector representing the AWGN. G is a KS×NS matrix representing the spatio-temporal channel matrix and z is a KS×1 vector representing the AWGN at all K users and all S symbols.

2.1 Faster-than-Nyquist

FTN signaling manages to pack more information in time domain, see FIGS. 1 and 2 respectively. In the system model definition, no assumptions on the symbol-rate have been made so far. It can be easily deduced that if Nyquist signaling with symbol period $T_{ny}$ is used in combinations with sin c pulses, $\alpha[iT]=0, \forall i\neq 0$ are zero and the Toeplitz matrix reduces to a scaled identity $A=\alpha[0]I_S$. As a result, the output signal after pulse shaping can be straightforwardly expressed as: $X=\alpha[0]D$.

It is assumed that a signaling acceleration factor $\tau \leq 1$ is applied, so that the effective symbol period is $T=\tau T_{ny}$. It can be seen that the higher the acceleration the larger is the number of non-zero values in the A matrix. This can be explained by the fact that more pulses are packed in the time domain. Furthermore, as the total duration of the individual pulse remains constant, the value of $\eta$ increases as $\tau$ decreases (see Y. J. D. Kim, J. Bajcsy, and D. Vargas, "Faster-Than-Nyquist Broadcasting in Gaussian Channels: Achievable Rate Regions and Coding," *IEEE Transactions on Communications*, vol. 64, no. 3, pp. 1016-1030, 2016). For analytical simplicity, in this work a truncated Gaussian pulse shaping is adopted, so that the pulse duration is not infinite and the $\alpha$ values decrease monotonically.

3. FTN Symbol Level Precoding

3.1 Precoder Design

Previous symbol level precoding, SLP, solutions aimed at exploiting only the spatial domain interference (see, for example, M. Alodeh, S. Chatzinotas and B. Ottersten, "Energy Efficient Symbol-Level Precoding in Multiuser MISO Channels Based on Relaxed Detection Region," *IEEE Transactions Wireless Communications*, vol. 15, no. 5 pp. 3755-3767, May 2016). Using FTN signaling creates temporal correlation among the symbols (ISI) in time domain, which can be used to design spatio-temporal precoding. This type of precoding is capable of exploiting the interference in time and spatial domain. The new optimization should take into the account the multiuser interference and ISI. In this work, we aim at minimizing total power of the transmitted waveforms under per user quality of service, QoS, constraint. This QoS constraint is selected based on the required modulation and symbol error rate, SER, and it is predefined and fixed for the whole frame for each user. Moreover, users can have different QoS requirements. The optimization can be written in a matrix form as follows:

$$D(S, H, A, \gamma) = \frac{\min_D \|DA\|_F^2}{S} \quad (5)$$

$$HDA \trianglelefteq Q \odot S$$

where $Q = \sqrt{\gamma} \otimes 1_{1 \times S}$, $\gamma = [\gamma_1, \ldots, \gamma_K]$ are the SNR targets for each user and $\trianglelefteq$ is element wise operator that guarantees that each received symbol is in its correct detection region, as outlined for example in M. Alodeh, S. Chatzinotas and B. Ottersten, "Symbol-level Precoding Multiuser MISO Precoding for Multi-level Modulation," *IEEE Transactions Wireless Communications*". By way of example, a 16-QAM constellation comprises four central or inner constellation points. The detection of the corresponding symbols should advantageously be exact, so that for those symbols, the notation $\trianglelefteq$ in the above constraint is equivalent to "=". A 16-QAM constellation further comprises twelve outer constellation points, surrounding the four inner constellation points. The detection regions for the outer constellation points are less constrained due to the geometry of the constellation. For example, for the outer constellation points of the first quadrant, the notation $\trianglelefteq$ is equivalent to "≥", in order to ensure correct symbol detection at a receiver. Using the vector representation as in (3)-(4), the optimization in (5) can be reformulated as follows (Since S is constant, it does not affect the optimization problem and it is dropped in the following formulations):

$$d(s, H, A, \gamma) = \min_d \|x\|^2 \quad (6)$$

$$\text{s.t. } G_j d \trianglelefteq \sqrt{\gamma_j} s_j \forall j \in K$$

where $G_j = [g_j^T[1], \ldots, g_j^T[S]]^T$ denotes the S×NS spatio-temporal channel matrix for the user j, and $s_j$ is a S×1 vector representing the data symbol for user j over S symbols. It should be noted that this optimization problem is solved at symbol-level without ignoring the ISI from the next symbols. It follows from the FTN system model introduced in section 2.1 and from Equation (4) that the effect of ISI is captured by the matrix G, through its dependence on matrix A. Therefore, the results of this optimization, i.e. the set of precoded symbols, depends on the FTN signaling rate. The precoded symbols further depend on the shape of the signal pulses. By further manipulating the optimization in (6), the problem can be written as:

$$d(s, H, A, \gamma) = \min_d \|(I \otimes A^T)d\|^2, \quad (7)$$

$$\text{s.t. } \begin{cases} \mathcal{C}_1 : \|g_j[n]d\|^2 \trianglelefteq \kappa_j^2[n]\gamma_j \sigma^2 \\ \mathcal{C}_2 : \angle g_j[n]d = \angle s_j[n], \forall j \in K, \forall n \in S \end{cases}$$

where $\kappa_j$ denotes the factor $\kappa_j = |s_j|/\sqrt{E_D[|s_j|^2]}$ changes on a symbol-basis and adjusts the long-term SINR based on the amplitude of the desired symbol. Respecting the first two sets of constraints $C_1$ and $C_2$ allows the reception of the data symbols with certain signal to noise ratio, SNR, level.

3.1.1. Detailed Optimization for Circular Modulation

For any circular modulation (MPSK, APSK), the optimization can be expanded as following:

$$d(s, H, A, \gamma) = \min_d \|(I \otimes A^T)d\|^2, \quad (8)$$

$$\text{s.t. } \begin{cases} \mathcal{C}_1 : \mathcal{R}\{g_j[n]d\} \trianglelefteq \sqrt{\gamma_j} \, \sigma \mathcal{R}\{s_j[n]\} \\ \mathcal{C}_2 : \mathcal{I}\{g_j[n]d\} \trianglelefteq \sqrt{\gamma_j} \, \sigma \mathcal{I}\{s_j[n]\} \forall j \in K, \forall n \in S \\ \mathcal{C}_3 : \mathcal{I}\{g_j[n]d\} - a_j[n] \mathcal{R}\{g_j[n]d\} = 0, \end{cases}$$

where $$\mathcal{R}\{g_j[n]d\} = \frac{g_j[n]d + d^H g_j^H[n]}{2}, \quad (9)$$

$$\mathcal{I}\{g_j[n]d\} = \frac{g_j[n]d - d^H g_j^H[n]}{2i},$$

$$a_j[n]| = \tan(\angle s_j[n]).$$

$C_1$, $C_2$ and $C_3$ can be formulated to guarantee that the received signal lies in the correct detection region, which depends on the data symbols.

For the inner-constellation symbols, the constraints C1, C2 should guarantee that the received signals achieve the exact constellation point. The constraints can be written as:

$$\mathcal{C}_1 : \mathcal{R}\{g_j[n]d\} = \sigma\sqrt{\gamma_j} \mathcal{R}\{s_j[n]\}$$

$$\mathcal{C}_2 : \mathcal{I}\{g_j[n]d\} = \sigma\sqrt{\gamma_j} \mathcal{I}\{s_j[n]\} \quad (10)$$

$C_3$ is not required in this case.

Outermost constellation symbols, the constraints C1, C2 should guarantee the received signals lie in the correct detection, which is more flexible than the inner constellation points. The constraints can be written as:

$$\mathcal{C}_1 : \mathcal{R}\{g_j[n]d\} \geq \sqrt{\gamma_j} \mathcal{R}\{s_j[n]\}, \mathcal{R}\{s_j[n]\} \geq 0$$

$$\mathcal{R}\{g_j[n]d\} \leq \sqrt{\gamma_j} \mathcal{R}\{s_j[n]\}, \mathcal{R}\{s_j[n]\} \leq 0$$

$$\mathcal{C}_2 : \mathcal{I}\{g_j[n]d\} \geq \sqrt{\gamma_j} \mathcal{I}\{s_j[n]\}, \mathcal{I}\{s_j[n]\} \geq 0$$

$$\mathcal{I}\{g_j[n]d\} \leq \sqrt{\gamma_j} \mathcal{I}\{s_j[n]\}, \mathcal{I}\{s_j[n]\} \leq 0 \quad (11)$$

$C_3$ guarantees that the received symbol has a certain phase. It should be clear that tan( ) cannot preserve the sign. Therefore, $C_1$, $C_2$, and $C_3$ should be used together.

The problem has a quadratic objective and linear constraints, which can be solved efficiently using convex optimization tools, as outlined, for example in S. Boyd and L. Vandenberghe, Convex Optimization, Cambridge University Press.

3.1.2. Detailed Optimization for Rectangular Modulation

For rectangular modulation (e.g. MQAM), the previous optimization can be simplified as:

$$d(s, H, A, \gamma) = \min_d \|(I \otimes A^T)d\|^2, \quad (12)$$

$$\text{s.t. } \begin{cases} \mathcal{C}_1 : \mathcal{R}\{g_j[n]d\} \trianglelefteq \sqrt{\gamma_j} \, \sigma \mathcal{R}\{s_j[n]\} \\ \mathcal{C}_2 : \mathcal{I}\{g_j[n]d\} \trianglelefteq \sqrt{\gamma_j} \, \sigma \mathcal{I}\{s_j[n]\} \forall j \in K, \forall n \in S \end{cases}$$

$C_1$, $C_2$ can be formulated to guarantee that the received signal lies in the correct detection region, which depends on the data symbols. A detailed formulation for $C_1$, $C_2$ can be expressed as For the inner-constellation symbols, $C_1$, $C_2$ can be formulated as in Eq. (10).

For outer constellation symbols, the constraints C1, C2 should guarantee the received signals lie in the correct detection. The constraints can be written as:

$$\mathcal{C}_1: \mathcal{R}\{g_j[n]d\} \geq \sigma\sqrt{\gamma_j}\mathcal{R}\{s_j[n]\}, \mathcal{R}\{s_j[n]\} \geq 0$$

$$\mathcal{R}\{g_j[n]d\} \leq \sigma\sqrt{\gamma_j}\mathcal{R}\{s_j[n]\}, \mathcal{R}\{s_j[n]\} \leq 0$$

$$\mathcal{C}_2: \mathcal{I}\{g_j[n]d\} = \sigma\sqrt{\gamma_j}\mathcal{I}\{s_j[n]\}. \quad (13)$$

$$\mathcal{C}_1: \mathcal{R}\{g_j[n]d\} = \sigma\sqrt{\gamma_j}\mathcal{R}\{s_j[n]\}$$

$$\mathcal{C}_2: \mathcal{I}\{g_j[n]d\} \geq \sigma\sqrt{\gamma_j}\mathcal{I}\{s_j[n]\}, \mathcal{I}\{s_j[n]\} \geq 0$$

$$\mathcal{I}\{g_j[n]d\} \leq \sigma\sqrt{\gamma_j}\mathcal{I}\{s_j[n]\}, \mathcal{I}\{s_j[n]\} \leq 0 \quad (14)$$

Outermost constellation symbols, the constraints C1, C2 should guarantee the received signals lie in the correct detection. The constraints can be formulated as in Eq. (11).

The problem set out in Eqs. (8)-(12) can be solved using linearly constrained quadratic programming, see for example S. Boyd and L. Vandenberghe, Convex Optimization, Cambridge University Press.

3.2 Discussion on Receiver Complexity

In known FTN systems, it is required to have an equalizer at receiver to mitigate the effect of ISI, see for example J. B. Anderson, F. Rusek, and V. Owall, *"Faster-Than-Nyquist" Signaling"* Proceedings of the IEEE, Vol. 101, no. 8, pp. 1817 1830, August 2013. In accordance with the present invention there is no need for any equalization at the receiver side since ISI is tackled using SLP at the transmitter. Therefore, the receiver architecture is simplified since ISI has been tackled at symbol-level at the transmitter.

4. Numerical Results

In order to assess the performance of the proposed transmissions schemes, Monte-Carlo simulations of the different algorithms have been conducted to study the performance of Faster Than Nyquist Symbol Level Precoding, FTN SLP, in accordance with the invention, and to compare it to spatial domain SLP as described for example in [12] M. Alodeh, S. Chatzinotas and B. Ottersten, *"A Multicast Approach for Constructive Interference Precoding in MISO Downlink Channel,"* in the proceedings of International Symposium in Information theory (ISIT), 2014. The simulated scenario is K=2 and each of the receivers is served using QPSK with $\gamma_j$=4.77 dB, $\forall j \in K$, M=10, the number of channel generations equals to 100, the channel is fixed for 10 symbols (i.e. S=10). The adopted channel model is assumed to be $$h_k \sim N(0, \sigma^2). \quad (15)$$

In this section, we study the performance of the effective rate and energy efficiency at different acceleration factors $\tau$, it should be highlighted that when $\tau$=1, the precoding design is the spatial domain SLP as discussed in the literature referenced here above.

Although the rate is usually defined by the assigned modulation, the errors due to the noise effective play an important factor in the achieved rate, which we herein call the "effective rate", defined as $$\bar{R}_j = \frac{R_j(1 - SER_j)}{\tau}, \quad (16)$$

where $R_j$ is the error-free rate for the user j (the maximum rate that can be achieved by a certain modulation). To capture the joint effect of symbol error rate, SER, consumed power and the effective rate, we use the energy efficiency metric, which can be defined as:

$$\eta = \frac{R_j(1 - SER_j)}{\tau \|DA\|_F^2} S. \quad (17)$$

Figure 5:
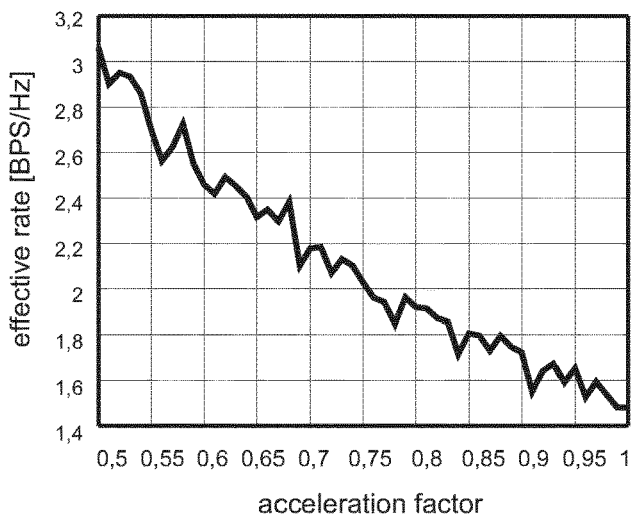
FIG. 5 illustrates the gains in terms of effective rate, brought about by the invention, as a function of the signaling acceleration factor, compared to signaling at Nyquist's signaling condition.

FIG. 5 depicts the effective rate with respect to the acceleration factor $\tau$. It should be noted that the curve has a decreasing trend with r. But this trend is smooth due the fact that sampling at some $\tau$ leads to better collective properties for all users, for example at some values of $\alpha$ the temporal interference has constructive properties. In $\tau$=0.5-0.51, the effective rate is higher than 3 bps/Hz.

Although the used modulation is QPSK (i.e. maximum rate equals to 2 bps/Hz), with FTN SLP, we can have effective rate associated with higher modulation (16 APSK, 16 QAM). This effect continues for $\tau$=0.51-0.74, where the effective rate is associated with (8 PSK, 8QAM) modulations. For $\tau$>0.74, the effective rate is associated with QPSK modulation. Interestingly, effectively higher rates are achievable using less constraints $C_1$, $C_2$ in Eqs. (8)-(12).

Figure 6:
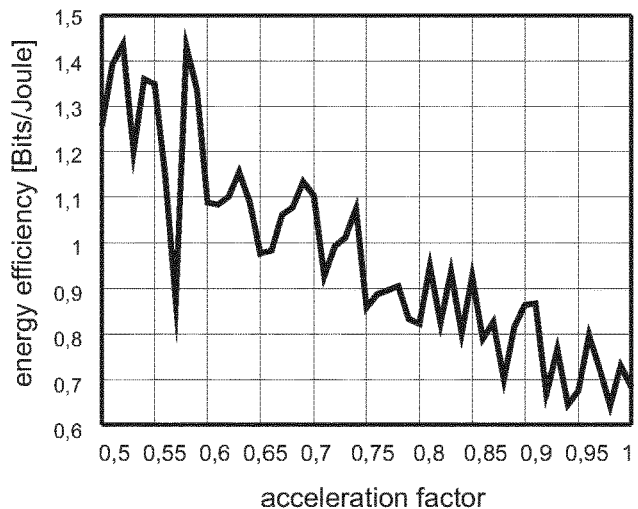
FIG. 6 illustrates the gains in terms of energy efficiency, brought about by the invention, as a function of the signaling acceleration factor, compared to signaling at Nyquist's signaling condition.

FIG. 6 depicts the performance of the energy efficiency with respect to the acceleration factor. It can be noted that the energy efficiency performance has a different trend than the effective rate due to the fact that the energy efficiency is a function of the both the effective rate and the power required to achieve this target rate so this figure illustrates the trade-off between them.

Furthermore, the general trend is that energy efficiency improves as we accelerate our symbol rate. The highest achieved energy efficiency when $\tau$=0.52 and $\tau$=0.58 and the lowest achieved energy efficiency when $\tau$=0.97 and $\tau$=0.94, these values are very close to $\tau$=1. In these cases, the used acceleration cannot compensate for the increased required power to achieve the SNR target.

It should be understood that the detailed description of specific preferred embodiments is given by way of illustration only, since various changes and modifications within the scope of the invention will be apparent to the person skilled in the art. The scope of protection is defined by the following set of claims.

The present work and invention has been supported by the Luxembourg National Research Fund, FNR, under FNR ANR GRANT Broadsat 10079323.

The invention claimed is:

1. A method for sending a first number of data messages, each data message comprising blocks having a second number of data symbols, simultaneously from a data transmission device to a number of receivers, wherein the number of receivers is equal to the first number of data messages, and wherein each data message is addressed to one of the receivers, over a Multiple Input Single Output, MISO, channel, the channel introducing inter-user interference on transmitted signals, the method comprising the following steps:

a) selecting, using selection means, a signal constellation associated with a digital modulation scheme, the signal constellation comprising a plurality of constellation points, wherein each constellation point is associated with a data symbol and with a corresponding detection region;

b) for the data symbols of each set of blocks, wherein a set of blocks comprises one block from each one of the first number of data messages, i) computing corresponding precoded symbols that correspond to the data symbols in the set of blocks;
ii) modulating a carrier signal in accordance with said digital modulation scheme, to represent a modulated signal for each of said precoded symbols;
iii) generating signal pulses corresponding to each of said modulated signals;
iv) transmitting said signal pulses on said MISO channel;
c) wherein the signal pulses corresponding to consecutive sets of blocks are transmitted at a signaling rate that is higher than the Nyquist rate associated with said signal pulses, thereby introducing inter-symbol interference; and wherein the computation of said precoded symbols depends on said signaling rate so that, after suffering said inter-user interference and said inter-symbol interference during transmission, the data symbols of the blocks from each set of blocks, received at the respective receivers, lie in their corresponding detection regions.

2. The method according to claim 1, wherein channel state information describing the inter-user interference is received at the transmitter, through feedback received from said receivers.

3. The method according to claim 1, where each block comprises one data symbol.

4. The method according to claim 1, wherein the data transmission device comprises a number of transmit antennas configured for transmitting said signal pulses, wherein the number of transmit antennas is larger than the first number of data messages and receivers.

5. The method according to claim 1, wherein said digital modulation scheme is selected so that a predetermined data transmission rate is achieved during said transmission to the receivers.

6. The method according to claim 1, wherein said MISO channel is a wireless channel.

7. The method according to claim 1, wherein said precoded symbols are transmitted to their respective receivers in a data frame comprising a preamble identifying the selected digital modulation scheme and the associated signal constellation.

8. The method according to claim 1, wherein the symbol transmission period, during which said signal pulses corresponding to consecutive sets of blocks are transmitted, has a duration that is substantially equal to 0.5 to 0.95 times the transmission period corresponding to the Nyquist signaling rate.

9. A data transmission device (100) for transmitting precoded data symbols using digitally modulated pulse shaped signals (10) to a first number of receivers over a common Multiple Input Single Output, MISO, data communication channel, comprising:

a memory element (110) for storing a first number of data messages, wherein each data message is addressed to one of the receivers;

a data transmitter (120) adapted to transmit data to each of said receivers using at least one of said data communication channel's multiple inputs at a signaling rate that is higher than the Nyquist rate associated with the used signal pulses; and a data processor (130) operationally coupled to said memory element (110) and data transmitter (120), configured to perform the method according to claim 1.

10. The data transmission device according to claim 9, comprising a number of transmit antennas configured for transmitting signal pulses, wherein the number of transmit antennas is larger than the first number of receivers and data messages.

11. The data transmission device according to claim 9, comprising a data receiver configured for receiving channel state information feedback from said receivers.

12. A non-transitory computer readable medium having computer readable instructions stored thereon, which when executed by a computer causes the computer to carry out the method according to claim 1.

13. The method according to claim 1, wherein at step b) i), the number of precoded symbols is equal to the first number of data messages times the second number of data symbols that are comprised in a block.

* * * * *